Patented Sept. 27, 1938

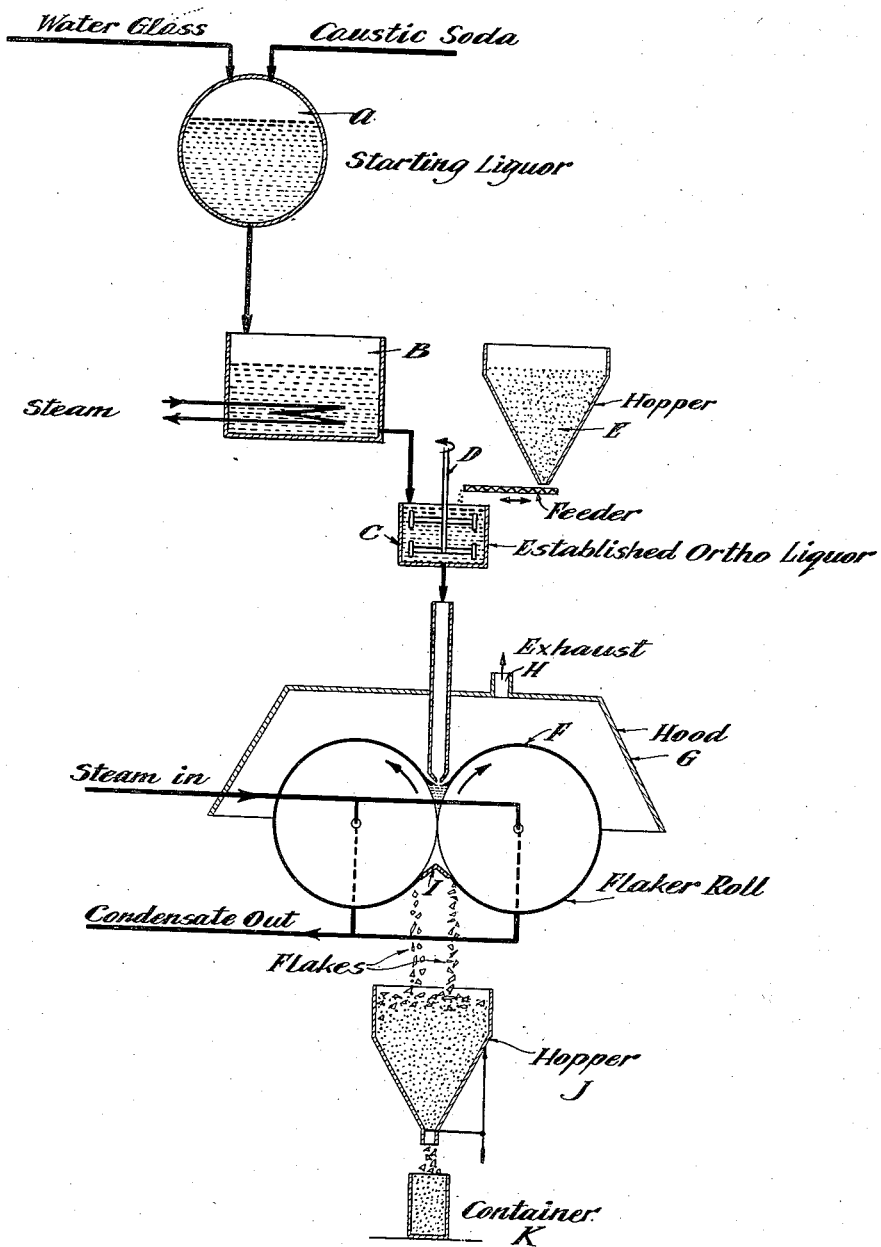

2,131,718

UNITED STATES PATENT OFFICE 2,131,718

STABLE, HYDROUS SILICATE AND METHOD OF MAKING SAME

George Ridgley McDaniel, Cincinnati, Ohio, assignor, by mesne assignments, to Diamond Alkali Company, Pittsburgh, Pa., a corporation of Delaware Application July 2, 1936, Serial No. 88,645

13 Claims. (Cl. 23—110)

This invention relates to a new method for producing crystalline sodium silicates in hydrated, stable form, and also to chemical compositions new to the silicate art.

In view of the fact that the concepts of the present invention deviate appreciably from those which are conventional in the manufacture of alkali metal silicates, an analysis of the methods which have been used in the past and of the compositions which have been produced by such methods, is requisite in order to appreciate the full novelty of the method herein disclosed, and likewise to account for the unexpected nature of the advance in an art otherwise highly developed.

Silica is known to react with the alkali metals in a variety of different ways. One of the oldest and most common of these forms is ordinary sodium silicate, which, commonly, in the past has been referred to as "waterglass". Sodium silicate or silicate of soda is the general name applied to a group of commercial materials composed of varying proportions of sodium oxide ($Na_2O$) and silicon dioxide ($SiO_2$), either as a solid or in water solution. The manufacture of sodium silicate is generally carried out by the fusion of a mixture of soda ash and sand at a red or white heat, although a number of other methods are known such as high temperature fusion of sand and caustic soda, or like fusion of sand, sodium sulfate and carbon. The waterglass is used extensively in industry for adhesive purposes, in paper making, in soap making, and in many other fields. In these commercial solutions of silicate, however, the ratio of $Na_2O$ to $SiO_2$ generally varies between one and one-half to four mols of silica to one mol of sodium oxide. The amount of alkali metal oxide is always less than the silica, and these materials, therefore, are only mildly alkaline.

More recently a variety of silicate which are more alkaline in character have been proposed for industrial purposes and some of these have met with considerable success. The most common of these materials is sodium metasilicate, $Na_2O.SiO_2$, which is comprised, as indicated by the formula, of one molecular part of alkali metal oxide reacted with one molecular part of silica.

Generally in the manufacture of sodium metasilicate the method is to add caustic soda to a liquid silicate of the type of waterglass in an amount sufficient to produce the desired molecular ratio. In some instances excess caustic soda is used to facilitate the formation of a given hydrate of metasilicate, and in other instances, the solution is prepared to correspond in composition to the exact hydrate of metasilicate desired. In the preparation a quantity of water also is added to facilitate the solution of the caustic soda in the waterglass, and the excess water, if necessary, then is evaporated from the admixture or solution. After the solution is prepared, the temperature is supercooled below the melting point, usually accompanied by agitation, and crystallization finally is permitted to take place. Seed crystals frequently are added to the solution to provide foci of crystallization, in order to accelerate crystal growth, and ultimate solidification.

The metasilicate appears in a number of different forms, which differ from one another in the degree of hydration. Industrially, the pentahydrate ($Na_2SiO_3.5H_2O$), which melts in its own water of crystallization at a temperature of approximately 72° C., and which is produced by crystallization, from the liquor supercooled to a temperature somewhat below the 72° melting point, is most common. Metasilicates other than the pentahydrate, however, are provided by simple manipulations in the production technique. Thus, adjustments in the temperature at which crystallization is permitted to take place, and also adjustments in the amount of water present in the starting solution enable the production of the six hydrate ($Na_2SiO_3.6H_2O$), a material which melts around 62° C. and also metasilicates with 8 and 9 waters of crystallization. These materials melt at temperatures of about 49 and 47° C., respectively.

Still more recently, a composition which has been identified as sesquisilicate, sometimes referred to as pyrosilicate, also has been disclosed. In this material, one and a half molecular parts of $Na_2O$ are combined with one molecular part of silicon dioxide. The alkalinity of the sesqui- or pyro-silicate is increased over that of the metasilicate, and likewise the alkalinity is substantially increased over the alkalinity of waterglass.

In the case of the sesquisilicate, as in the case of metasilicate, the method of preparation likewise is to prepare, then supercool, a hot solution in which the $Na_2O$ and the $SiO_2$ are proportioned to facilitate the growth of sesquisilicate crystals. Upon cooling, the solution deposits crystals of sodium sesquisilicate which are separated from the remaining mother liquor by suitable means. The temperature usually is kept high during the preparation of the solution to prevent crystal growth, and then the temperature of supercooling is kept low; that is, below the melting point, to induce crystallization and facilitate the production of solids or crystals susceptible to subsequent crushing, grinding and comminution.

From the brief resume of the teachings of the prior art, it will be seen that the silicates of the alkali metals, of the water soluble variety, in general, in the past, have been produced by either one of two methods, viz.:

a. Fusion reaction of silica and alkali at very high temperature; or
b. Crystallization, induced by the super-cooling of a solution established for the purpose.

It may be mentioned that several mechanical admixtures of silicates and other materials also have been proposed. These products, in general, are characterized as simple, mechanical admixtures of individual materials, the individual properties of which are desired, and the resultant products, of course, are exemplified as mixtures, not compounds.

Silicate substances of the type of meta- and sesquisilicate are peculiar in that they tend to exhibit a quality of instability. When a comminuted mass of impure metasilicate crystals, for example, is stored in an ordinary container or bottle for a period of time, the particles frequently are found to have become caked together and set up into a hard solid mass, which is relatively impossible to handle conveniently. It has been alleged that a cause of such caking, or instability, or agglomeration in the hydrous salts or mixture of them, is the transfer of water from one crystal to another. It has likewise been alleged that caking and agglomeration are less likely to occur where all of the discrete particles are of the same composiiton, or of the same vapor pressure. Improvements in the production technique have enabled the preparation of masses from which discrete particles, which are of the same composition, or of the same vapor pressure, can be obtained by grinding; and, as a general rule, the crystalline silicates, commercially available at the present time, are not particularly unstable, yet the tendency toward instability is a difficulty almost immediately encountered as soon as one attempts the preparation of silicate substances which differ generally from the silicates of the type discussed.

The general theory in the art has been that a requisite of stability, in addition to the factors which have already been mentioned, is that the given composition be a true chemical compound. The stable silicate substances, and also the silicate crystals which have been grown in mother liquor with seed crystals as the foci are usually comprised of quantities of $Na_2O$ to $SiO_2$ in which the proportions may be expressed in terms of simple whole numbers. For this reason, those skilled in the art have thought that only the substances of this type are of the true chemical compound variety.

By reason of the fact that the greatest market for the more alkaline silicates is in the detersive industries, where the materials are valuable as ingredients in cleaning compounds, or as individual ingredients in the cleaning and laundering processes, and the like, it will be understood that the characteristics of crystallinity and stability are extremely important, since these are the physical qualities which relate to, and primarily satisfy the requisites involved in measuring, handling, storage and merchandising.

The present invention resides in a series of discoveries, concepts and determinations which depart considerably from the teachings of the prior art, which have required and received practical verification and which are as follows:

The first discovery upon which the present invention is predicated resides in the determination that, if the temperature of a molten or liquid silicate of comparatively low water content is controlled, during a preparatory period, then a liquor, substantially clear and transparent, (except for entrapped air bubbles) containing from one and three-fourths to as much as two and one-fourth times as much sodium oxide as is present in ordinary metasilicate, can be provided by dissolving caustic soda in the molten or liquid base silicate.

Otherwise expressed, I have determined that molten or liquid base or starting silicate of the type described possesses the capacity to absorb or dissolve extremely large quantities of alkali, and possesses a useful life, sufficiently long to permit of handling, if the temperature of the liquor is controlled relatively closely.

Therefore, it is the concept, initially, in the production of the new compounds herein disclosed, to establish a solution which contains approximately 1.75 to 2.25 molecular parts of sodium oxide to one molecular part of $SiO_2$ and of such water content as to be amenable to subsequent operations herein disclosed. For the purposes of the present disclosure the silicate liquid, in which the sodium oxide:silicon oxide ratio is in the range indicated, is referred to hereinafter as "established ortho liquor".

Still more important, however, I have discovered that an established ortho liquor of the type indicated, crystallizes when it is heated. The crystals which are produced by this new method of "thermal crystallization" are hard and frangible. Moreover, the compounds which are produced, whether they be in the form of fragments, large particles, or products in a fine state of subdivision, are completely stable and non-caking.

Broadly speaking, therefore, the present invention may be said to reside in the process which comprises:

(1) The establishment of a liquor having the general formula: $nR_2O.SiO_2 xH_2O$ in which $n$ equals a value from about 1.75 up to and including about 2.25.

$R_2O$ represents sodium oxide, and $xH_2O$ represents the number of molecules of water of crystallization in the general range of approximately 5–7.

(2) This liquid is thermally crystallized within a relatively short time after its establishment by elevation of the temperature of the liquid. Usually the temperature at which thermal crystallization takes place is in the neighborhood of 100–150° C.

The disclosure of the present invention is related herein primarily from the commercial point of view, and, in this respect, ordinary sodium metasilicate pentahydrate in the liquid or molten condition exemplifies the starting material to which caustic soda is added. Sodium metasilicate pentahydrate is available commercially in large quantities at reasonable prices in the form of crystals which may be melted, or this material may be manufactured in liquid condition in the manner well understood by those skilled in the art. For these reasons the practical embodiment of the present invention is disclosed in relation to this material as the raw silicate source.

On the other hand, I have determined that the sesquisilicate and even some grades of ordinary waterglass or sodium silicate also are suitable as base or starting materials in establishing the ortho liquor.

According to the process of the present invention, caustic soda is added and dissolved in a suitable base silicate starting material of the type previously described, until the ratio of approximately 1.75 to 2.25 molecular parts $R_2O$ to 1 part $SiO_2$ is provided. Stirring usually is necessary to accomplish the complete dissolution of the alkali and the resulting product is ready for crystallization when a drop of the liquid taken from the batch is substantially clear and transparent. When it is desired to use metasilicate as the base or starting material, the temperature of the metasilicate, in the liquid state, is maintained between about 60 and 80° C. during the time that the caustic soda is being added, the preferred range being about 70 to 75° C. On the other hand, alkali may be added to a starting material such as sodium silicate, or "waterglass" at atmospheric temperature. During addition, a rise in temperature takes place, and adjustments in temperature thereafter may be made to bring the temperature of the liquor within the preferred range of approximately 70 to 75° C., if desired, in order to facilitate or improve the useful period of life of the liquor. If the temperature, during the dissolution of the caustic soda, is too low, then it is difficult to dissolve all of the caustic soda, or reach the desired condition of dissolution. On the other hand, if the temperature is too high, then the established ortho liquor, in the liquid phase has a relatively short life. In the present specification the term "transparency" of drops of ortho liquor or "clear solution" is used to designate an optimum condition of dissolubility in the established ortho liquor. Of course, when caustic soda is added to the starting liquid, tiny bubbles of air are entrapped and the general appearance of a mass of established ortho liquor may be turbid for that reason, yet, if drops of the liquor are viewed, they usually exhibit a condition of clarity. It should be understood that the optical condition referred to is not known to possess any virtue in and of itself, other than to indicate at one stage of the process, the physical and/or chemical relationship which has been found to favor subsequent thermal solidification.

The liquor herein denoted as established ortho liquor, which has the general formula 1.75–2.25 $Na_2O,1SiO_2$ is relatively unstable and tends to set up to a pasty consistency within approximately five to fifteen minutes after it has been prepared. During this period (the length of time will vary according to the temperature of the solution, the nature of the container, the nature of agitation, if any, and variation of the chemical consistency) thermal crystallization of the liquid is caused to take place by heating, and the crystallizing temperature is of the order of 100–150° C. The notable thing is that the mass changes from liquid to solid state through the application of heat, without extraction, removal or addition of chemical components from or to the body. From the point of view of crystallisis, the change which takes place when the established ortho liquor is heated, is essentially a change of state from liquid to solid, and it is in this sense that the term, transposing the mass from liquid to solid state by heating, is intended in the present specification and in the claims.

In the preferred practice of the invention it is recommended that substantial elevation in the temperature of the established ortho liquor take place relatively promptly. If the heating is very slow, degradation of the established liquor into a pasty mass, rather than thermal crystallitic solidification is likely to take place. On the other hand, if prolonged heating at a high degree of temperature is permitted to take place, then dehydration accompanies evaporation of water of crystallization, and the rate of solubility of the final product in water tends to be affected.

When the established ortho liquor is heated to a temperature of about 130–150° C., thermal crystallization takes place in the order of 1 to 3 minutes, the actual time depending upon the accomplishment of the actual heat transfer. It will be understood that if a very bulky volume of the ortho liquor is attempted to be thermally crystallized, the outer layer, in contact with the source of heat, will crystallize rapidly, but the liquid in the interior might set up to a pasty mass before its temperature is elevated sufficiently to effect crystallisis.

ESTABLISHMENT OF ORTHO LIQUOR

In order to assist the skilled in the art in the practice of the present invention the following examples are provided to illustrate the formulation and establishment of ortho liquor from various starting materials.

*Example 1.*—Preparation of hydrated sodium orthosilicate, $Na_4SiO_4 \cdot 6.1H_2O$ from sodium metasilicate To sodium metasilicate liquor ($Na_2SiO_3 \cdot 5H_2O$) at a temperature of approximately 70–75° C., caustic soda (76% lye flake) is added in the following proportions:

200 parts by weight metasilicate liquor
76.9 parts by weight caustic soda (76% lye flake)

The size of the batch should be such that not much longer than one minute is required for the actual addition of the caustic. The dissolution should be carried out with stirring. About three to four minutes is required for the complete solution of the caustic soda. This product, drops of which are substantially clear and transparent, constitutes the established ortho liquor, which is stable in the liquid phase for approximately eight to ten minutes. Within this time the established ortho liquor is heated to a temperature between 100–150° C. for thermal crystallization hereinafter more fully described.

*Example 2.*—Preparation of the composition, $1.75Na_2O \cdot 1SiO_2 \cdot 5.8H_2O$, from sodium metasilicate To 200 parts by weight of sodium metasilicate liquor, ($Na_2SiO_3 \cdot 5H_2O$), at a temperature of approximately 70–75° C. are added 57.7 parts by weight of caustic soda (76% lye flake) with stirring. The caustic soda dissolves completely after stirring from three to four minutes. The solution is then heated promptly, without further stirring, to a temperature between 100–150° C., in the manner hereinafter more fully discussed.

*Example 3.*—Preparation of the composition, $2.25Na_2O \cdot 1SiO_2 \cdot 7H_2O$, from sodium metasilicate In the manner described in Example 1, 200 parts by weight of sodium metasilicate liquor ($Na_2SiO_3 \cdot 5H_2O$) 10.8 parts by weight of water and 96.2 parts by weight of caustic soda (76% lye flake) are dissolved together and then thermally crystallized as hereinafter described.

*Example 4.*—Preparation of sodium orthosilicate, Na₄SiO₄·6H₂O, from sodium sesquisilicate crystals In the manner of procedure described in Example 1, 32.5 parts by weight of caustic soda (76% lye flake) are dissolved in 200 parts by weight of sodium sesquisilicate crystals

$$(3Na_2O \cdot 2SiO_2 \cdot 11H_2O)$$

which has been melted to a liquid condition, the temperature of which is adjusted to approximately 70–75° C. Crystallitic solidification is caused to take place in the method hereinafter more fully described.

*Example 5.*—Preparation of sodium orthosilicate, $Na_4SiO_4 \cdot 6H_2O$, from 60° Baumé silicate of soda (waterglass)

Silicate of soda of 60° Baumé, which is the preferred starting point according to this example, has a molecular ratio of about $1Na_2O$ to about $1.93SiO_2$. The following analysis is typical of this grade:

|  | Per cent |
|---|---|
| $Na_2O$ | 18.7 |
| $SiO_2$ | 35.0 |
| $H_2O$ | 46.3 |
| Total | 100.0 |

According to this method of establishing "ortho liquor", 141.1 parts by weight of caustic soda (76% lye flake), the preferred source of $Na_2O$, is dissolved in 200 parts by weight of the 60° Baumé silicate of soda at about atmospheric temperature. In establishing the solution it is preferred to dissolve first approximately 46 parts by weight of the caustic soda with stirring in the silicate of soda at room temperatures. The solution of this amount of alkali takes place within a few minutes, and is accompanied by a rise in temperature. Next, the temperature of the solution thus provided preferably is adjusted to approximately 70–75° C., and the remainder of the caustic soda (about 95.1 parts by weight) is added, with stirring. The remainder of the procedure is as described in Example 1.

*Example 6.*—Preparation of sodium orthosilicate, $Na_4SiO_4 \cdot 6.5H_2O$, from sodium metasilicate Proportions:
  200 parts by weight of metasilicate liquor ($Na_2SiO_3 \cdot 5H_2O$)
  7 parts by weight water
  76.9 parts by weight of caustic soda (76% lye flake)

Ortho liquor is established by the mixing and preparation of these components in the manner of Example 1. Crystallitic solidification is conducted as hereinafter described.

*Example 7.*—Preparation of the composition, $2.25Na_2O \cdot 1SiO_2 \cdot 7.2H_2O$, from 58.8° Baumé silicate of soda (waterglass)

The preferred starting point according to this example is 58.8° Baumé silicate of soda which has a molecular ratio of about $1Na_2O$ to $1.63SiO_2$. The following analysis is typical of this grade:

|  | Per cent |
|---|---|
| $Na_2O$ | 19.4 |
| $SiO_2$ | 30.6 |
| $H_2O$ | 50.0 |
| Total | 100.0 |

The "ortho liquor" is established in this example by dissolving 136.2 parts by weight of caustic soda (76% lye flake) in 200 parts by weight of 58.8° Baumé silicate of soda at a temperature of 30–40° C. The caustic soda should be dissolved by stirring. The ortho liquor thus established is heated promptly to a temperature between approximately 100–150° C., for thermal crystallization in the manner hereinafter more fully described.

*Example 8.*—Preparation of the composition, $1.9Na_2O \cdot 1SiO_2 \cdot 5.98H_2O$, from sodium metasilicate Proportions:
  200 parts by weight metasilicate liquor ($Na_2SiO_3 \cdot 5H_2O$)
  69.2 parts by weight of caustic soda (76% lye flake)

These components are mixed and prepared in the manner of Example 1.

It will be understood by those skilled in the art that the numerical values given in the foregoing examples are not precisely critical.

In all of these examples, it seems highly peculiar and illogical to attempt the dissolution of such large quantities of caustic soda in the relatively small amounts of liquid silicates indicated, when the liquids already are relatively thick and viscous. The final solid products, on the other hand, exemplify the characteristics of solid solutions in that droplets of the established ortho liquor, from which they are made, are clean and substantially clear and transparent, and solidify under the influence of heat to hard crystallitic stable bodies. Usually, some stirring or agitation is necessary in establishing the "ortho liquor", but the time intervals involved, as I have determined, are not so short as to hamper or prevent successful practice of the invention under large scale industrial methods of production.

The final products, which have been thermally crystallized in the manner hereinafter more fully discussed, are white, stable, crystallitic compounds which dissolve rapidly in water and leave no residue. In the present disclosure the term "stability" is used to denote a condition which is characterized by the absence of deleterious, physical or chemical change. The products of the invention do not cake together, become agglomerated, or change physically to become impossible to pour, or handle conveniently and it is in this respect that the meaning of the term "stable" is characterized.

THERMAL SOLIDIFICATION

The process of thermal crystallization enables the formation of a stable solid from the liquor of like composition, or like proximate analysis, by any one of a number of different mechanical procedures.

It is a concept of the present invention to pour established ortho liquor onto heated rolls, then remove the final product from the rolls in the form of flakes of the type of soap chips, or flakes of mica. In this new form a highly alkaline and highly useful, stable chemical is provided. The flakes are relatively brittle, they may vary considerably in thickness to suit the particular characteristics desired, and are unique in view of the fact that they dissolve in water extremely rapidly, yet are not particularly deliquescent.

The method of providing such flakes, and particularly flakes of the new compound, hydrated sodium "ortho" silicate, is described more fully hereinafter with reference to the accompanying drawing.

Another method, however, of affecting the thermal crystallization of the liquor is by the spraying of the liquor into a heated chamber, relatively promptly after the liquor has been prepared. In this instance, thermal crystallitic solidification is accomplished in a heated zone during the flight of the atomized particles of liquor through the zone. The temperature of the zone in such instances may be in the neighborhood of 125 to 175°, or more, in accordance with the nature and the size of the particles atomized and the permitted length of travel through the zone. The atomizing of a liquor into a heated chamber involves a relatively simply technique well understood by those skilled in the art. It may be mentioned that an atomizing nozzle, made of Monel metal or like material which is resistant to alkali attack, is suitable. The final product is a powdery, granular, free flowing mass.

On the other hand, I have found also that thermal crystallization may be caused to take place with satisfactory results by the casting of the established ortho liquor into ordinary casting pans, accompanied with a heating of the pans to a temperature of around 150° C. In this method, it is recommended that the layers of liquid be not substantially over one inch in thickness, otherwise proper heat transfer into the interior part of the layer is not possible. In the casting method, hard cakes are provided in a few minutes time and the cakes, after they have cooled, are crushed and screened in the usual manner. The products may be passed through a dry heated zone, if it is desired to reduce the degree of hydration, for example, say from 6 waters more or less to, say, 5 waters more or less.

A peculiar lamellar crystal structure sets up in cast cakes. When the cakes are crushed or struck, flat tabular fragments which are quite analogous to fragments of mica or slate, are provided. In some instances, the interfaces of the flat fragments appear to be slightly moist with exuded liquid. It is not known at the present time whether this liquid represents the excess water (containing dissolved solid matter), remaining after hydration of the crystals, or whether it represents liquid mechanically exuded during crystallization. This moisture quota, however, when it is present, does not disturb the stability of the granules provided from the crushed solids and is removed readily, in any convenient manner, mechanically or by evaporation.

Figure 1 in the drawing, which is attached hereto, illustrates diagrammatically one method for manufacturing flaked, stable, alkali metal silicates of the present invention.

In Figure 1 of the illustration which is attached hereto, the mechanical aspects of the method for manufacturing the stable flakes of sodium silicates of the present invention are disclosed diagrammatically. In the process disclosed, waterglass or commercial silicate of soda, such as 40°–42° Baumé solution, and say 50° Baumé caustic soda, in the proper proportions are run into a chamber A, equipped for evaporation of excess water. In the chamber A liquid silicate starting material is established and from this container the liquid is run into an auxiliary container B, preferably equipped with insulation and with heating means in order that the temperature of the liquor therein may be controlled. Starting liquor from the auxiliary container B, and flake caustic soda are transferred for admixture to vessel C, where establishment of the ortho liquor takes place. The vessel C preferably is equipped with a stirring apparatus D and may be mounted on a weighing platform for proportioning of the contents, if desired. The flake caustic soda mechanically is fed to the vessel C from the hopper E by means of a vibrating feeder, or similar suitable instrumentality, and the elements of the apparatus preferably are adjusted for either continuous or batch operation. Any portions of pasty solids, which from time to time may be formed on the walls of the vessel C, are dissolved in the incoming starting liquor so that any tendency toward clogging of the apparatus is minimized. Next, the ortho liquor established in the vessel C, is transferred, through appropriate means, to a flaking machine F, which preferably is housed under a hood G, from which exhaust fumes are withdrawn through the duct H to the atmosphere, in the conventional manner. If desired, the vessel C may be mounted directly over the nip of the flake rolls for direct feed.

The flaking element in the process preferably comprises either a pair of coacting rolls, oppositely rotated, or a single roll, which, if desired, may be fed directly from a suitable container. In either case the rolls are equipped for heating thereof to a temperature of about 100–150° C., more or less, the temperature depending upon the desired thickness of the flakes. In the manner disclosed, the established ortho liquor is fed into the nip or trough of the rolls at a rate adjusted in accordance with the intended film thickness. The film of substance is thermally crystallized in traveling with the rolls through the peripheral movement thereof, and the final flakes are stripped from the rolls by means of the blade elements I which are disposed at the lower nip in contact with the respective roll surfaces.

It will be understood that the flaker rolls are rotated at a rate adjusted in accordance with the diameter of the rolls, the thickness of the film, established thereupon, the composition of the film and the temperature at which the rolls are maintained. Rolls of about six feet in diameter have been found to be suitable.

In the practice of the present invention I have determined that nickel or Monel metal appropriately resists any corrosive attack by the silicate material disposed thereon, and it is recommended therefore that the rolls at their outer surfaces be provided with these or like metal surfaces.

The flakes strip from the rolls by the stripper bars I, drop into a hopper J through which they are discharged into barrels or suitable containers K.

The foregoing description is disclosed to exemplify the present invention from the mechanical point of view. Modifications of the instrumentalities described will be comprehended readily by those skilled in the art and it should be understood that the invention is not limited particularly to the means shown.

The materials of the present invention are unique in several important respects. They dissolve quickly in water. Some heat of solution is liberated when the materials are dissolved, but the amount of heat is less than that liberated when caustic soda, for example, is dissolved. Still more important, however, is the fact that the materials provide water-white, clear solutions and leave no residue. In this respect it may be mentioned that it has been proposed in the past to react a substantial quantity of alkali with sand, but the reaction products of such processes have been contaminated with sand inclusions, and it has thus been impossible to provide solutions without residue.

From the strict, academic point of view, the evidence which is available indicates that the compositions of the present invention exhibit the behavior of true chemical compounds or quasi-compounds. It has been determined, from X-ray crystallograms that the products consistently exhibit uniform lines of reflection, or X-ray patterns. These reflection patterns are individual to the particular products herein disclosed and do not, as is the case with ordinary mechanical mixes, correspond simply to the line patterns of the alkali superposed over the line patterns of the base silicate. At the same time the line patterns are clear and sharp, which is contrary to the result when amorphous or heterogeneous materials are subjected to X-ray scrutiny.

In industry the alkaline silicates of the present invention are useful for many purposes. The products are excellent detergents and are particularly valuable where high, sustained alkalinity is desirable or requisite. Likewise, in metal cleaning, and degreasing operations, in laundering and in other instances where sustained pH value is desired, a new, inexpensive material is provided for use.

Having described my invention, I claim:

1. The method of preparing a stable sodium silicate of the type of orthosilicate, in the hydrated form, which method comprises preparing a liquor comprised of approximately 1.75 to 2.25 molecular parts of sodium oxide, for each one molecular part of silica and containing an amount of water sufficient to produce a hydrate and to permit of crystallization of substantially all of said liquor, at a temperature of approximately 60–80° C., then substantially elevating the temperature of said liquor at a rate sufficiently rapid and to a degree sufficiently high to crystallize all of said liquor to solid state without substantial evaporation of water.

2. A method of preparing a stable dust-like powder consisting of crystalline hydrous sodium silicate, which method comprises spraying a liquor comprised of about 5–7 molecular parts of water, about 1.75–2.25 sodium oxide and about 1 molecular part of silica of which the temperature is about 70° to 75° C., into a heated zone, the temperature of which is about 100° to 150° C. and transposing the liquid to solid state before substantial evaporation of water takes place.

3. The method which comprises substantially continuously discharging a film of liquor comprised of about 1.75 to about 2.25 molecular parts of sodium oxide, about 1 part of silicon dioxide, and having a water content sufficient to produce a hydrate and to permit of crystallization of substantially all of the liquor on a moving surface, the temperature of which is approximately 100°–150° C. to effect solidification of substantially all of the liquor of said film to a solid state, and substantially continuously removing said film from said moving surface in the form of stable crystallitic flakes.

4. The method of preparing a stable hydrate of sodium silicate comprised of approximately 1.75 to 2.25 molecular parts of sodium oxide to each one molecular part of silicon dioxide, which method includes the steps of preparing a solution of the proximate composition of such hydrate using an amount of water in preparing the solution sufficient to enable the production of a hydrate and to permit of crystallization of substantially all of the solution, of casting such solution in film form, and then substantially elevating the temperature of said film at a rate sufficiently rapid to effect crystallization of substantially all of the liquor of said film without substantially diminishing the water content of the film.

5. A method of preparing a stable, crystalline, hydrous sodium silicate, which method comprises preparing a liquor comprised of substantially 1.75 to 2.25 molecular parts of sodium oxide to each one molecular part of silicon dioxide and containing an amount of water sufficient to produce a hydrate and to permit of crystallization of substantially all of said liquor, and then heating such a liquor to a temperature of substantially 100 to 150° C. with substantially no evaporation of water, to transpose the liquor to solid, crystallitic state.

6. A method of preparing a stable, crystalline, hydrous sodium silicate, which method comprises preparing a liquor comprised of substantially 1.75 to 2.25 molecular parts of sodium oxide to each one molecular part of silicon dioxide, and containing an amount of water sufficient to produce a hydrate and to permit of crystallization of substantially all of the liquor, and then elevating the temperature of such liquor to a degree sufficiently high to transpose the liquor to solid crystallitic state, with substantially no evaporation of water.

7. A method of preparing stable flakes of hydrous sodium silicate, which method comprises preparing a liquor comprised of substantially 1.75 to 2.25 molecular parts of sodium oxide to each molecular part of silicon dioxide and containing an amount of water sufficient to produce a hydrate and to permit of crystallization of substantially all of the liquor, and then spraying such a liquor into a zone in which the temperature is sufficiently high to transpose the liquor particles, with substantially no evaporation of water, to crystallitic, solid particles.

8. A method of preparing a stable, crystalline, hydrous sodium silicate, which method comprises preparing a liquor comprised of substantially 1.75 to 2.25 molecular parts of sodium oxide to each molecular part of silicon dioxide and containing an amount of water sufficient to produce a hydrate but limited in amount to enable crystallization of substantially all of the liquor, and then discharging the liquor in a film on a moving surface having a temperature sufficiently high to crystallize the film thereon to solid state with substantially no evaporation of water.

9. A method of preparing a stable, crystalline, hydrous sodium silicate, which method comprises mixing caustic soda with liquid meta silicate liquor to obtain a solution comprising approximately 1.75 to 2.25 molecular parts of sodium oxide to each molecular part of silicon in the presence of an amount of water sufficient to produce a hydrate and to permit of crystallization of substantially all of the liquor to a solid, and then elevating the temperature of such liquor to a substantial degree, thermally to crystallize the liquor to a solid without evaporating water from it.

10. A method of preparing a crystalline, hydrous sodium silicate, which method comprises preparing a solution comprising approximately 1.75 to 2.25 molecular parts sodium oxide to each molecular part of silicon dioxide and containing an amount of water sufficient to provide the desired hydrate and to permit of crystallization thereof without evaporation of any water, then heating such a solution to a temperature of substantially 100 to 150° C. relatively promptly after the solution has been prepared to transpose the solution with substantially no evaporation of water to a crystallitic solid state.

11. A method of preparing a stable, hydrous sodium silicate, which comprises preparing a solution containing approximately 1.75 to 2.25 molecular parts of sodium oxide for each molecular part of silicon dioxide and containing an amount of water sufficient to produce a hydrate and not in excess of an amount which will permit of crystallization of all of the liquor to solid state when its temperature is elevated substantially, and then heating such a solution to elevate its temperature substantially, with substantially no evaporation of water to transpose it to such solid, crystallitic state.

12. The method of making a stable, hydrous sodium orthosilicate, which method comprises preparing a solution containing substantially two molecular parts of sodium oxide to each molecular part of silicon dioxide and containing from substantially 5 to 7 molecular parts of water for hydration and then heating such a solution to a temperature sufficiently high to enable the transposition of the solution to crystallitic solid state, with substantially no evaporation of water.

13. A method of making a stable, hydrous, sodium orthosilicate, which method comprises preparing a solution containing substantially two molecular parts of sodium oxide to each molecular part of silicon dioxide in the presence of a quota of water sufficient to produce a hydrate and permit of crystallization of substantially all of said solution, and then discharging a film of such solution on a heated surface, and heating such solution to a temperature sufficiently high to transpose the solution, with substantially no evaporation, to a solid, crystallitic film adapted to be broken into flakes.

GEORGE RIDGLEY McDANIEL.